Dec. 6, 1949          G. S. BOSTOCK ET AL                  2,490,335
                DIE FOR CUTTING-OUT PRESSES AS USED IN THE
                     MANUFACTURE OF BOOTS AND SHOES
Filed Jan. 4, 1946                                    6 Sheets-Sheet 3
FIG. 7
FIG. 3
FIG. 5
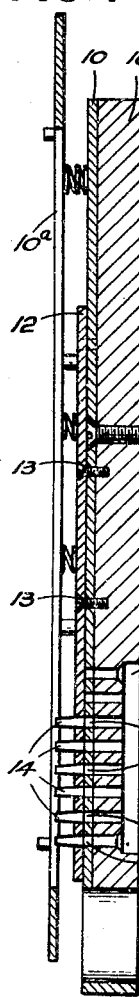
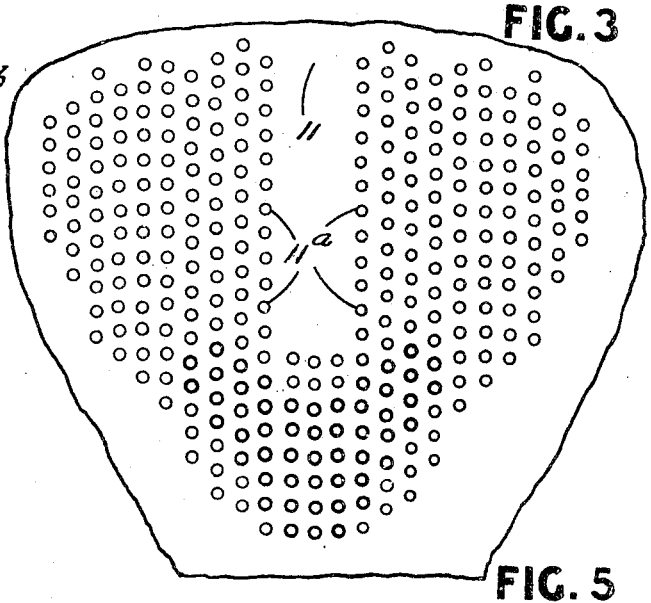
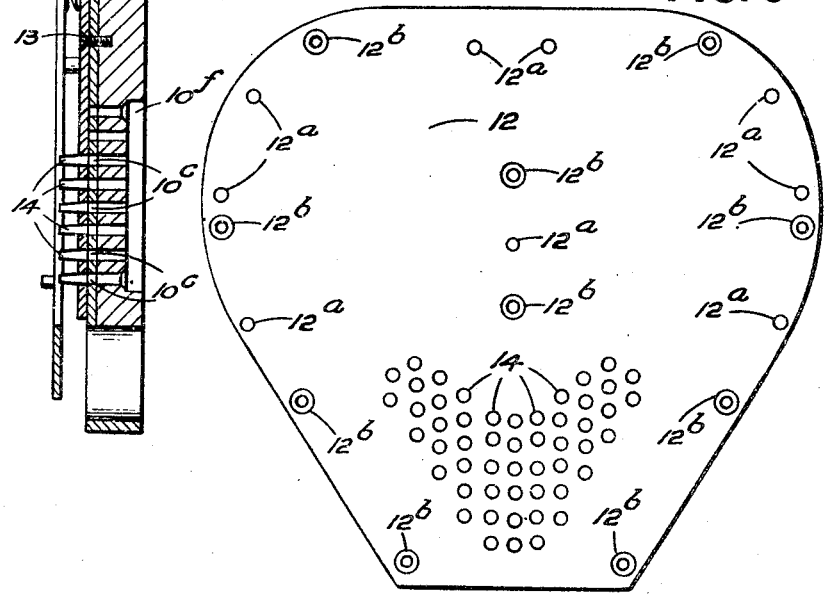
Inventors
Godfrey Stafford Bostock
Thomas George Sharples
By Marshall & Marshall
Attorneys Inventors
Godfrey Stafford Bostock
Thomas George Sharples
By Marshall & Marshall
Attorneys

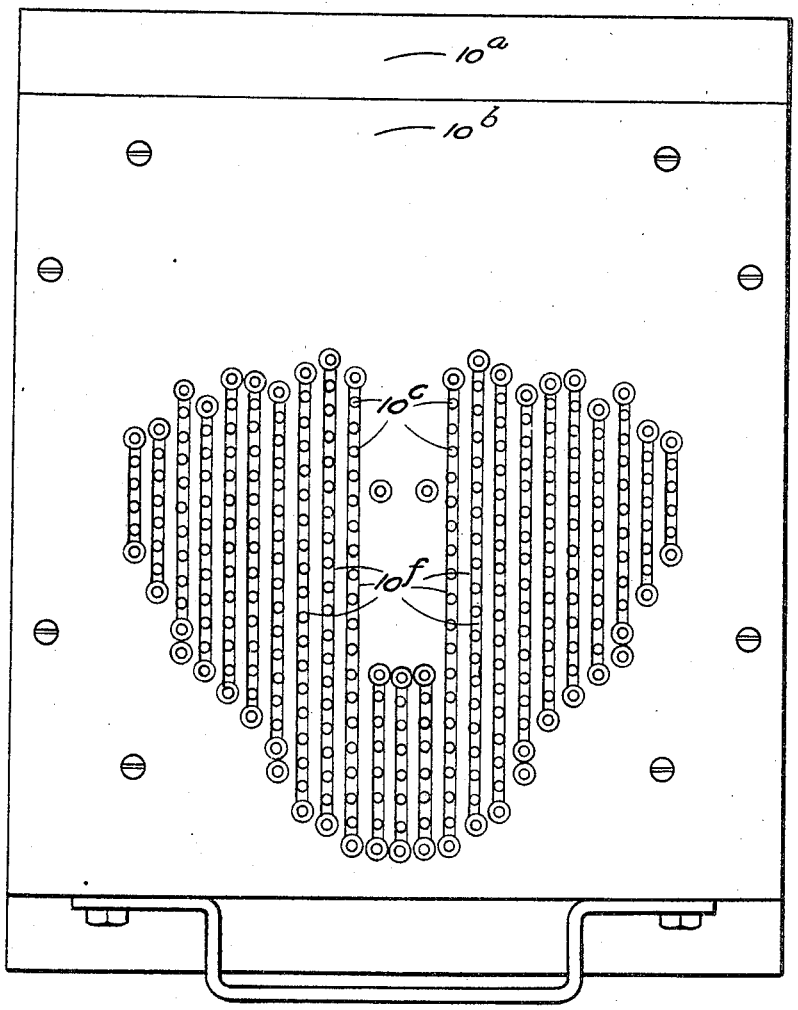

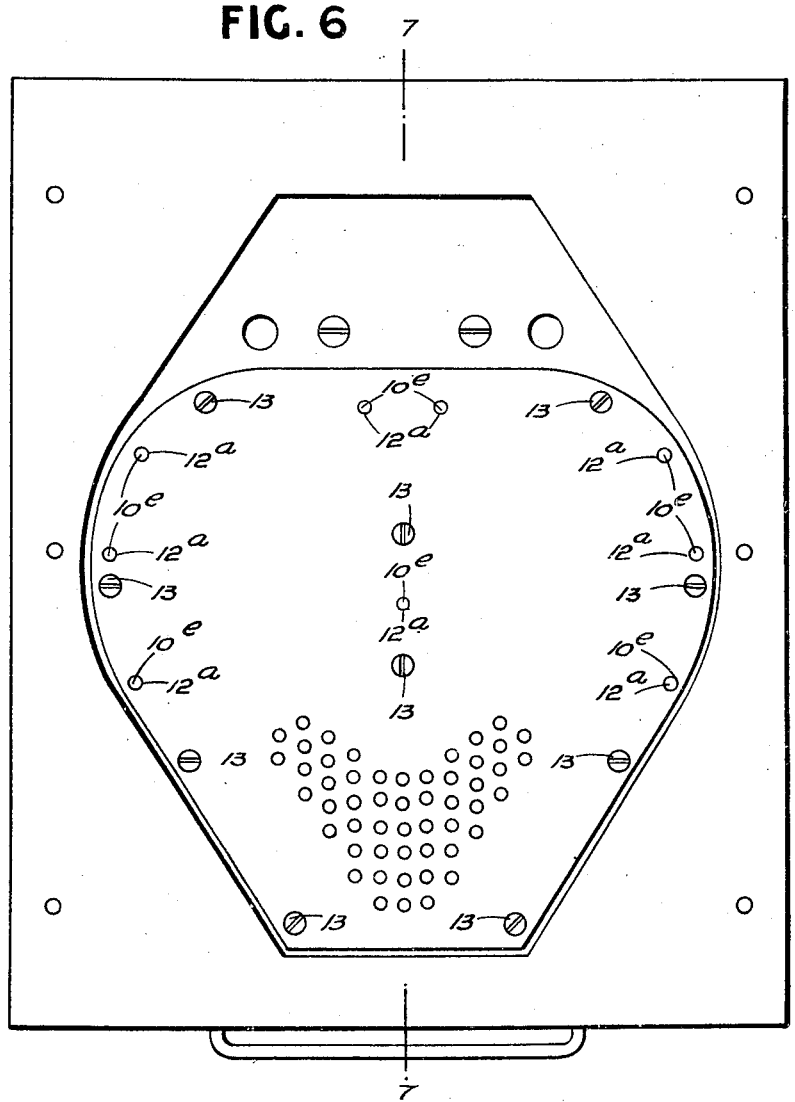

Dec. 6, 1949     G. S. BOSTOCK ET AL     2,490,335
DIE FOR CUTTING-OUT PRESSES AS USED IN THE
MANUFACTURE OF BOOTS AND SHOES
Filed Jan. 4, 1946     6 Sheets-Sheet 6

Inventors
Godfrey Stafford Bostock
Thomas George Sharples
By Marshall and Marshall
Attorneys Patented Dec. 6, 1949

2,490,335

UNITED STATES PATENT OFFICE 2,490,335

DIE FOR CUTTING-OUT PRESSES AS USED IN THE MANUFACTURE OF BOOTS AND SHOES

Godfrey S. Bostock, Tixall, Stafford, and Thomas G. Sharples, Stafford, England

Application January 4, 1946, Serial No. 639,133
In Great Britain October 5, 1945

5 Claims. (Cl. 164—93)

This invention has reference to improvements relating to dies for cutting-out presses as used in the manufacture of boots and shoes and is concerned particularly with dies employed for securing ornamentation by means of a pattern or arrangement of perforations.

In the boot and shoe industry it has been necessary heretofore for complete sets of new dies to be prepared whenever a new ornamentation of the kind aforesaid has been decided upon and as such dies are relatively costly to produce considerable expense is incurred each time a change of pattern or arrangement is required.

The present invention has for its object to provide an improved method of manufacture which facilitates the selection of a new arrangement or pattern and which enables the requisite punch carrying dies to be readily produced at a relatively low cost.

According to the invention dies for cutting-out presses as used in the manufacture of boots and shoes for obtaining ornamentation by perforation are produced by furnishing a master plate provided over its surface with a plurality of holes of a diameter corresponding to the internal diameter of the punches to be used, preparing a pattern from the holes transferring this pattern to a plate which is then fitted with the requisite punches in corresponding positions and subsequently securing this punch plate to the master plate so that the punches register with the relevant holes in the master plate.

According to the invention also dies for cutting-out presses as used in the boot and shoe industry for obtaining ornamentation by perforation comprise a master plate provided over the area of its working surface with a plurality of holes, a punch carrying plate of a standardised size provided with an arrangement of punches by selecting a pattern of holes from the master plate and then fitting the punch carrying plate with punches arranged accordingly, means for positioning the standardised punch carrying plate relatively to the master plate so that the punches register with the relevant holes in the master plate from which the punch arrangement was selected and means for securing the punch carrying plate in position on the master plate.

The invention will now be described with particular reference to the accompanying drawings which illustrate the invention as applied to ornamentation dies for use with a cutting-out press of a kind well known in the boot and shoe industry.

In the drawings—

Figure 2 is an underside plan of the master plate illustrated in Figure 1.

Figure 3 is a plan showing the manner of preparing a paper pattern sheet.

Figure 5 is a plan of the punch carrying plate prepared from the blank illustrated in Figure 4 and in accordance with the pattern selected on the pattern sheet illustrated in Figure 3.

Figure 6 is a plan showing the punch carrying plate shown in Figure 5 set up in the master plate illustrated in Figure 1 and ready for insertion in the press.

Figure 7 is a vertical section taken on the plane indicated by the line 7—7 Figure 6.

Like numerals of reference indicate similar parts in the several views.

Figure 1:
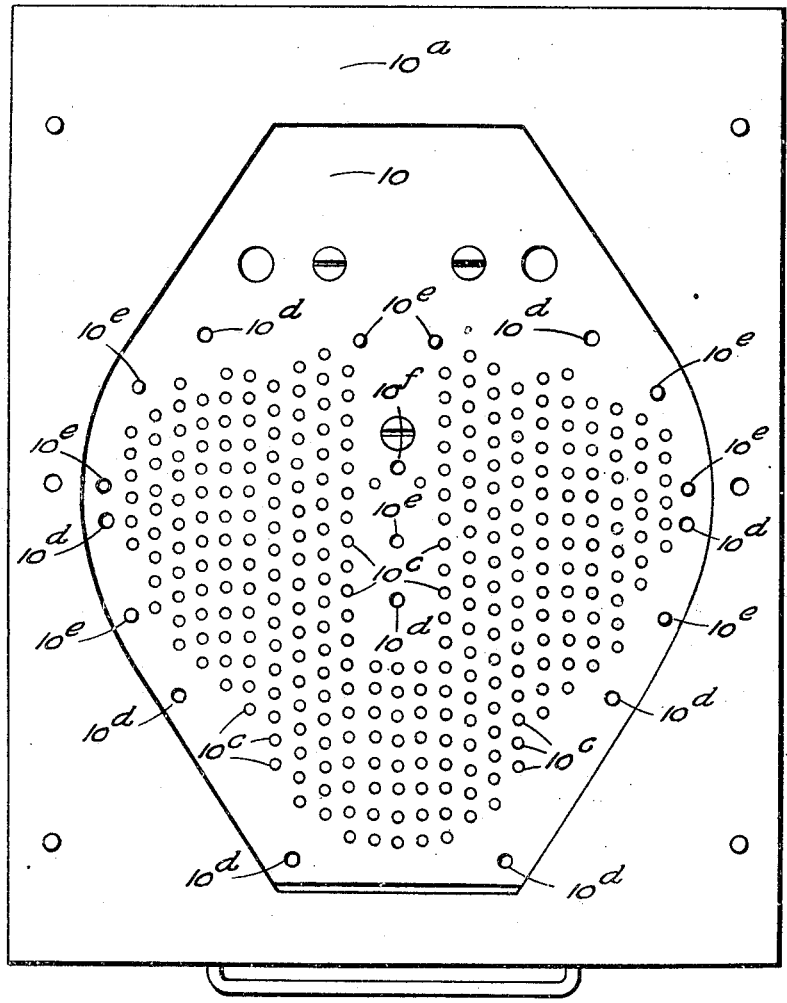
Figure 1 is a plan of a master plate.

According to the said embodiment of the invention there is provided a master plate 10 upon which is resiliently mounted and guided in known manner a pressure plate 10a having a central gapped portion. This master plate 10 is screwed to a base block 10b and together with the said base block 10b and a pressure plate 10a is adapted to be slidden into engagement with the platen of the press (not shown) in the usual manner. This master plate 10 is drilled over the whole of the surface corresponding to the maximum size of shoe piece ordinarily dealt with, with a plurality of spaced holes 10c of a diameter equal to the internal diameter of the holes of the particular perforated ornamentation to be selected, corresponding complementary holes also extending through the base block 10b. The master plate is provided around the perforated portion with tapped holes 10d and dowels 10e for a purpose to be described hereinafter. The underside of the base block 10b is slotted along the lines of holes 10c as at 10f for facilitating clearance of the said holes during perforation operations.

From this master plate 10 a pattern is made by superimposing on the master plate 10 a sheet of paper 11 having thereon a series of circles 11a arranged in a similar manner to the holes 10c and marking, as by ringing in heavy outline, those of the said circles 11a which correspond in position to the position of the holes 10c comprising the particular selected ornamentation (see Figure 3).

Figure 4:
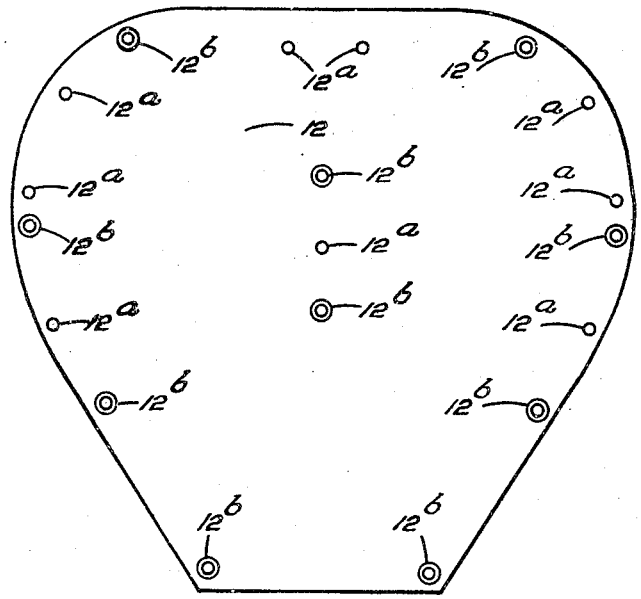
Figure 4 is a plan of the blank from which a punch carrying plate is prepared.

This pattern is transferred to a thin plate of sheet metal 12 of a standardised shape and size (see Figure 4) which is provided in the marginal portion with holes 12a which are complementary to dowels 10e projecting from the inwardly presented face of the master plate 10.

The sheet metal plate 12 which will be termed henceforth the punch carrying plate 12 is also provided with holes 12b for the passage of screws 13 by means of which the said punch carrying plate 12 may be secured to the master plate 10.

The punch carrying plate 12 is drilled in a manner corresponding to the pattern 11 and fitted with the usual tubular punches 14 the bores of which correspond with the relevant holes 10c in the master plate 10 when the punch carrying plate 12 is superimposed on the master plate with the dowels 10e engaging with the holes 12a and secured thereto by means of the screws 13 as is clearly seen in Figures 6 and 7.

It will be appreciated that once the master plate 10 has been produced it can be adapted readily for a change of pattern by simply fitting thereto a punch carrying plate 12 as hereinbefore described and which it will be appreciated can be produced at a relatively low cost.

On a large scale it is intended that a user should first be supplied with a die unit comprising a drilled master plate 10 and its associated pressure plate 10a and base block 10b and that when a punch carrying plate 12 is desired the requisite pattern should be taken from the master plate 10 and sent to a die maker who if a number of the punch carrying plates 12 is required prepares a jig from the pattern and then using the jig drills the required number of standardised punch carrying plates 12. After being fitted with punches 14 these plates 12 are sent to the user by whom they are secured to the respective master plates 10 which they are bound to fit by reason of the positioning means to which reference has been made already, i. e. that is the dowels 10e and the holes 12a.

It will be understood of course that if a change in diameter of a perforation is required a new master plate 10 and base block 10b bearing holes of a corresponding diameter is necessary.

Figure 8:
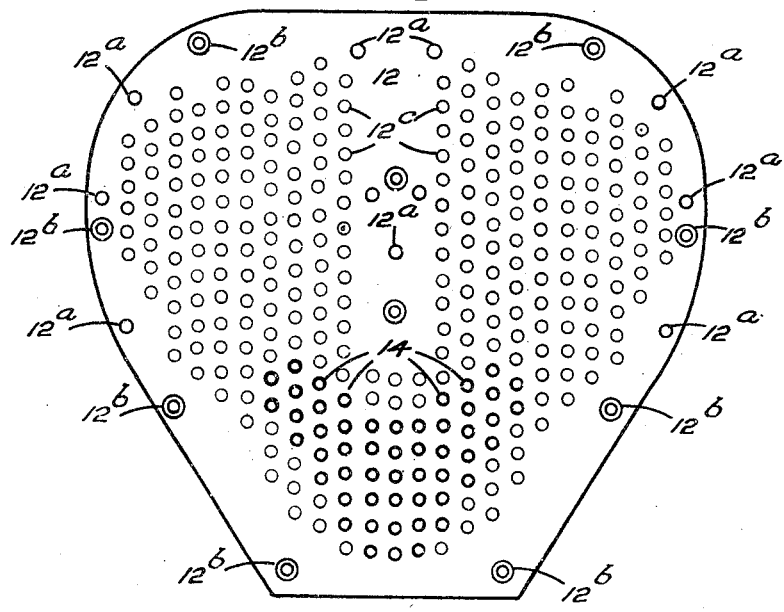
Figure 8 is a plan of a modified form of punch carrying plate.

In a modification as illustrated in Figure 8 the punch carrying plates 12 may be drilled in a similar manner to the master plate 10 so that when a plate 12 is being prepared for use it is only necessary to fit punches 14 to the holes 12c in the plate 12 corresponding to the position of the holes shown by the selected pattern.

Figure 9:
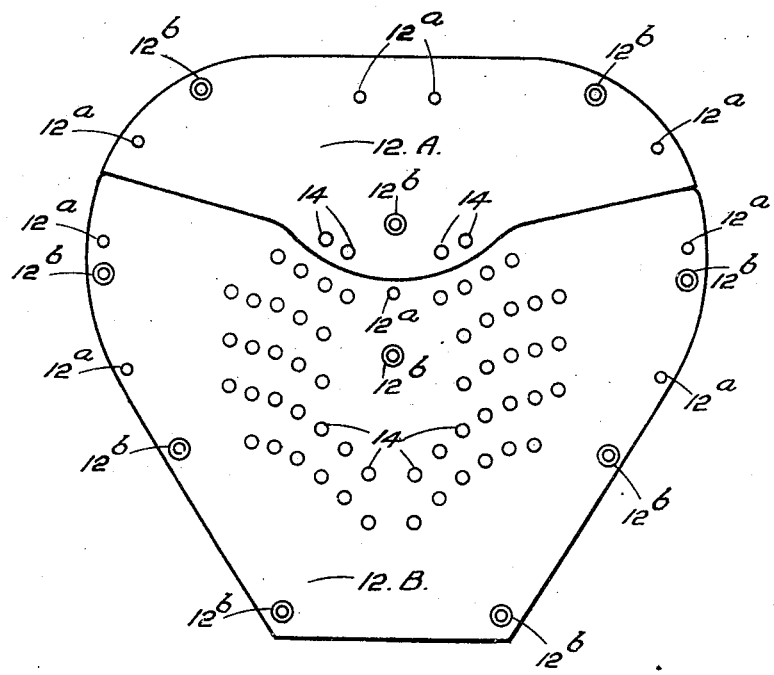
Figure 9 is a plan of a punch carrying plate formed in two parts.

In yet another modification as illustrated in Figure 9 the punch carrying plate 12 may be formed in two or more sections 12A, 12B each of which is provided with its own set of holes 12a for engagement with the respective set of dowels 10e and holes 12b for the passage of screws 13.

We claim:

1. Dies for cutting-out presses as used in the boot and shoe industry for obtaining ornamentation by perforation comprising a master plate provided over the area of its working surface with a plurality of holes, a punch carrying plate of a standardized size provided with an arrangement of punches by selecting a pattern of holes from the master plate and then fitting the punch carrying plate with punches arranged accordingly, means for positioning the standardised punch carrying plate relatively to the master plate so that the punches register with the relevant holes in the master plate from which the punch arrangement was selected and means for securing the punch carrying plate in position on the master plate, the punch carrying plate being positioned relatively to the master plate by means of an arrangement of complementary dowels and holes.

2. Dies for cutting-out presses as used in the boot and shoe industry for obtaining ornamentation by perforation comprising a master plate provided over the area of its working surface with a plurality of holes, a punch carrying plate of a standardized size provided with an arrangement of punches by selecting a pattern of holes from the master plate and then fitting the punch carrying plate with punches arranged accordingly, means for positioning the standardized punch carrying plate relatively to the master plate so that the punches register with the relevant holes in the master plate from which the punch arrangement was selected and means for securing the punch carrying plate in position on the master plate, the punch carrying plate being formed in two or more parts each of which is provided with its own securing and positioning means.

3. An ornamentation die for marking shoes by perforation, comprising, in combination, a multiple-use master die plate, said master die plate having a flat surface provided with a plurality of perforations extending throughout its area, a frame for said master die plate, and means on said master die plate for mounting any one of a series of standardized punch carrying plates, the punches being positioned in each of said punch carrying plates by reference to selected ones of the perforations in said master die plate, said means mounting said punch carrying plates in position on said master die plate with the punches carried thereby in registry with the respective perforations in said master die plate.

4. An ornamentation die according to claim 3 in which the punch carrying plate is made of light, inexpensive material incapable alone of withstanding die pressures.

5. An ornamentation die according to claim 3 in which the punch carrying plates are formed of a plurality of independently mountable sections, the punches in each section being positioned relative to those perforations in the master die plate to which they correspond.

GODFREY S. BOSTOCK.
THOMAS G. SHARPLES.

REFERENCES CITED

The following references are of record in the file of this patent:

UNITED STATES PATENTS

| Number | Name | Date |
|---|---|---|
| 196,395 | Springer | Oct. 23, 1877 |
| 1,095,116 | Kaven | Apr. 28, 1914 |
| 1,095,117 | Kaven | Apr. 28, 1914 |
| 1,118,180 | Bradley | Nov. 24, 1914 |
| 1,118,181 | Bradley | Nov. 24, 1914 |